(12) United States Patent
Lee

(10) Patent No.: US 6,427,821 B1
(45) Date of Patent: Aug. 6, 2002

(54) CLUTCH ASSEMBLY OF AUTOMATIC TRANSMISSION

(75) Inventor: Dong-Hun Lee, Kwangmyung (KR)

(73) Assignees: Hyundai Motor Company, Seoul; Kia Motors Corporation, Kwangmyung, both of (KR)

( * ) Notice: Subject to any disclaimer, the term of this patent is extended or adjusted under 35 U.S.C. 154(b) by 0 days.

(21) Appl. No.: 09/693,018

(22) Filed: Oct. 20, 2000

(30) Foreign Application Priority Data

Dec. 23, 1999 (KR) .............................. 99-60981

(51) Int. Cl.[7] .............................. F16D 13/52
(52) U.S. Cl. .............................. 192/109 F; 192/85 AA; 192/70.2
(58) Field of Search .............................. 192/109 F, 70.19, 192/70.2, 85 AA

(56) References Cited

U.S. PATENT DOCUMENTS

| | | | |
|---|---|---|---|
| 3,837,439 A | * 9/1974 | Piret | 188/217 |
| 4,640,294 A | * 2/1987 | Ordo | 192/70.2 |
| 4,813,522 A | * 3/1989 | Fujioka et al. | 192/70.2 |
| 5,103,953 A | * 4/1992 | Nakayama et al. | 192/85 AA |
| 5,687,821 A | * 11/1997 | Lorriette | 192/52.4 |
| 5,937,985 A | * 8/1999 | Dover et al. | 192/70.2 |
| 6,044,948 A | * 4/2000 | Okada et al. | 192/70.2 |
| 6,158,265 A | * 12/2000 | Prater | 72/326 |

* cited by examiner

Primary Examiner—Saul Rodriguez
(74) Attorney, Agent, or Firm—Christie, Parker & Hale, LLP

(57) ABSTRACT

A clutch assembly of an automatic transmission includes a clutch drum having a slanted inner surface at a corner formed by circumferentially bending an circumferential edge of the clutch drum, a plurality of friction members alternately arranged in the clutch drum, a piston for actuating the friction members, the piston contacting the friction members, and a cushion ring having a circumferentially slanted outer surface corresponding to the slanted inner surface of the clutch drum, the cushion ring being installed into the clutch drum so as to contact the slanted outer surface of the cushion ring with the slanted inner surface of the clutch drum.

10 Claims, 2 Drawing Sheets

CLUTCH ASSEMBLY OF AUTOMATIC TRANSMISSION

BACKGROUND OF THE INVENTION (a) Field of the Invention

The present invention relates to a clutch assembly of an automatic transmission, and in particular, to a multi-plate clutch assembly capable of reducing shift shock of the transmission.

(b) Description of the Related Art

FIG. 1 schematically shows a conventional clutch assembly. The clutch assembly 2 comprises a plurality of clutch plates 6 and clutch discs 8 alternately installed in a clutch retainer 4, a snap ring 10 mounted in a distal end portion of the retainer 4 so as to contact a last clutch plate, and a dished plate 14 interposed between a first clutch plate and a piston 12 so as to prevent the clutch plates and discs from abruptly being engaged. A return spring 16 is installed in the retainer 4 for returning the piston 12.

Typically, an automatic transmission is equipped with a wet multi-plate clutch as a gear shift mechanism. A TCU (transmission control unit) determines a vehicle's conditions on the basis of parameters from various sensors and responsively operates friction elements such as clutches and brakes by controlling valves of a hydraulic mechanism.

The dished plate is an optional element for enhancing the shift quality of the vehicle by providing a smooth engagement and quick disengagement of the clutch assembly.

However, the dished plate occupies a relatively large amount of space, that is, the installment of the dished plate requires 5 mm per clutch set to secure the space for the plate's thickness and stroke displacement and this increases the transmission size and weight. Furthermore, the adaptation of the dished plate increases the whole manufacturing cost of the transmission because the dished plate is an expensive item.

SUMMARY OF THE INVENTION

The present invention has been made in an effort to solve the above problems of the prior art.

It is an object of the present invention to provide a clutch assembly capable of reducing shift shock of an automatic transmission without using additional parts such as a dished plate, which causes increases in the size and weight of the transmission as well as whole manufacturing costs.

To achieve the above object, a clutch assembly of an automatic transmission according to the present invention comprises a clutch drum having a slanted inner surface at a corner formed by circumferentially bending a circumferential edge of the clutch drum, a plurality of friction members alternately arranged in the clutch drum, a piston for actuating the friction members, the piston contacting the friction members, and a cushion ring having a circumferentially slanted outer surface corresponding to the slanted inner surface of the clutch drum, the cushion ring being installed into the clutch drum so as to contact the slanted outer surface of the cushion ring with the slanted inner surface of the clutch drum.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will be described hereinafter with reference to the accompanying drawings.

Figure 1:
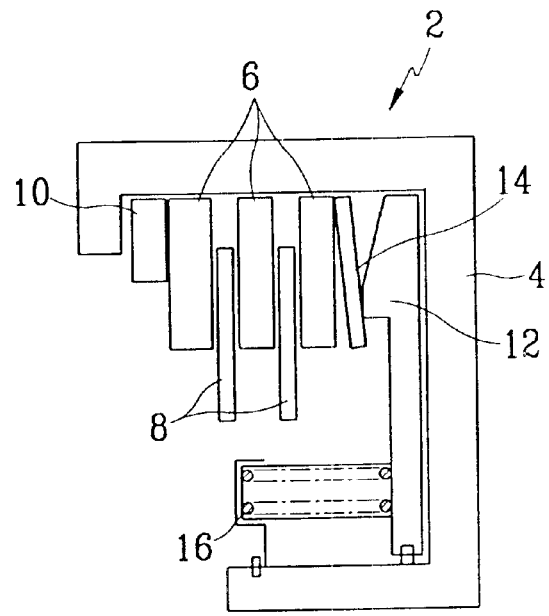
FIG. 1 is a schematic view showing a conventional clutch assembly.
Figure 2:
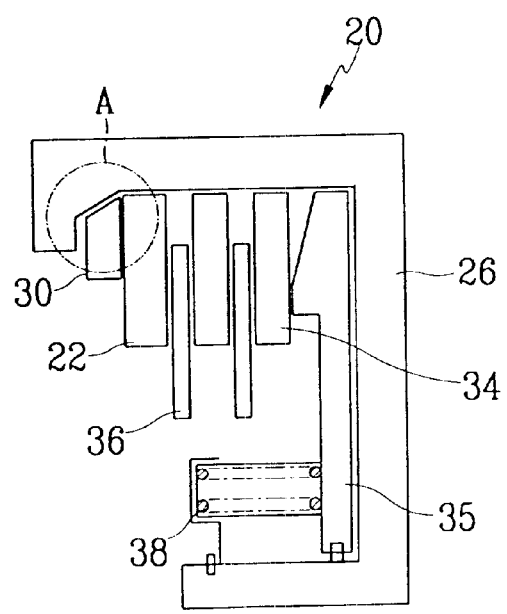
FIG. 2 is a schematic view showing a clutch assembly according to a preferred embodiment of the present invention.

FIG. 2 shows a sectional view showing a clutch assembly according to the preferred embodiment of the present invention.

A plurality of friction members, i.e. clutch plates 34 and discs 36, are alternately arranged in an axial direction in a clutch drum 26. Slidably disposed in the clutch drum 26 is a piston 35 so as to press the friction members 34 and 36. The piston 35 is biased by a return spring 38, and a cushion ring 30 is installed in the clutch drum 26 and is opposite to the piston 35 such that the clutch plates 34 are disposed therebetween.

Figure 3:
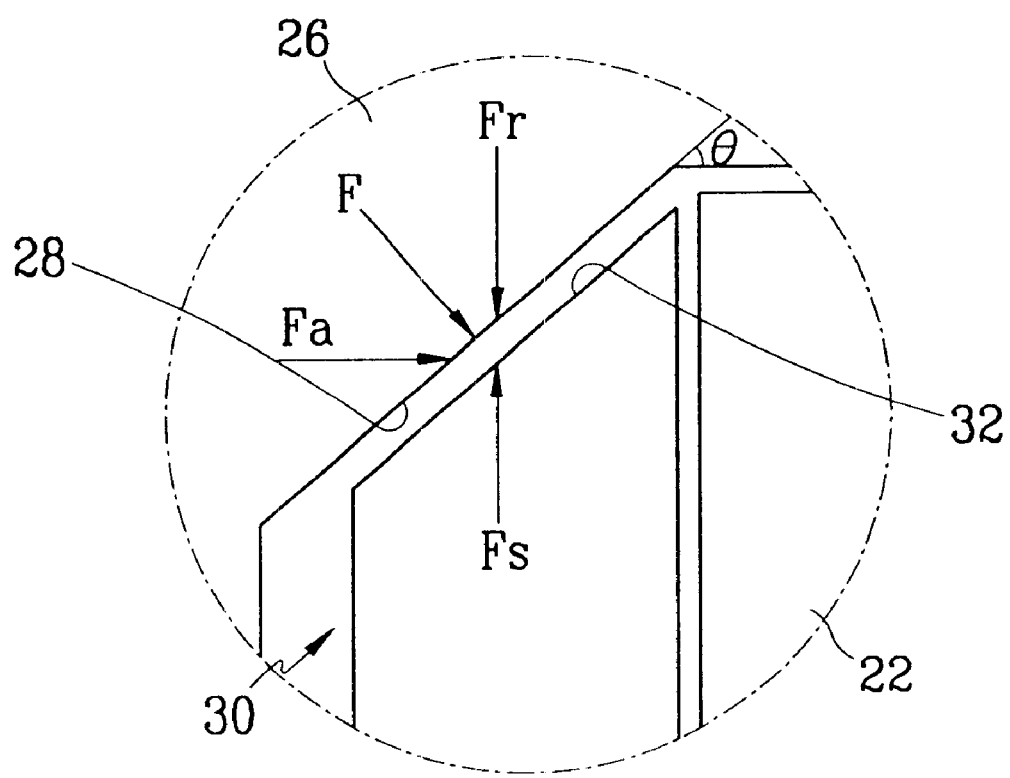
FIG. 3 is an enlarged view of a circled portion A in FIG. 2.

As shown in FIG. 3, the clutch drum 26 is provided with a slanted inner surface 28 having a predetermined angle at a corner that is formed by circumferentially bending an edge of the clutch drum 26.

The cushion ring 30 is also provided with a corresponding slanted surface 32 around its outer circumferential surface and installed in the clutch drum 26 with a radial elastic force. Since the slanted surface 32 of the cushion ring 30 contacts the slanted inner surface 28 of the clutch drum 26, a friction force F affected to the slanted surface 28 against the cushion ring 30 consists of a force Fr and a force Fa.

Also, the radial and axial direction forces generated by the cushion ring 30 are respectively equal to the forces Fr and Fa. Accordingly, the radial direction force Fr and the axial direction force Fa have a relationship of equation 1 below:

<Equation1>

$Fr = F \cos \theta$: radial direction force $Fa = F \sin \theta$: axial direction force $Fr = Fs$ therefore, $Fa = Fs/\cos = * \sin \theta = Fs \tan \theta$ As shown in Equation 1, the radial and the axial direction forces Fr and Fa can be adjusted by changing the elastic force Fs of the cushion ring 30 and the slant angle $\theta$.

The operation of the clutch assembly structured according to the preferred embodiment of the present invention will be described hereinafter.

Normally, the cushion ring 30 contacts to bias a reacting plate 22 because the elastic force of the cushion ring 30 generates the axial direction force Fa caused by the cushion ring 30 radically sliding on the slanted surface 28 of the clutch drum 26.

When the clutch assembly is required to provide its engagement, the piston 35 is operated to press the friction members 34 and 36 such that the piston 35 overcomes the elastic force of the spring 38 so as to engage the friction members 34 and 36 to each other. In this case, the clutch plates 34 and discs 36 are smoothly engaged to each other because the cushion ring 30 absorbs a push load caused by the piston 35 by gradually retreating against its elastic force. Accordingly, the transmission can avoid a shift shock caused by an abrupt engagement of the friction members.

While the clutch assembly is required to provide a disengagement, the piston 34 retreats by the elastic force of the return spring 38. In this case the cushion ring 30 helps prompt disengagement of the friction members 34 and 36. Accordingly, the prompt disengagement of the friction members 34 and 36 prevents the clutch assembly from experiencing a shift shock caused by loose disengagement.

As described above, since the clutch assembly is provided with a cushion ring acting as a shift shock-absorbing member such as a dished plate as well as a snap ring at the same time, it is possible to reduce the shift shock of the transmission without using an expensive dished plate, and to furthermore minimize the size of the transmission and the whole manufacturing costs.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A clutch assembly of an automatic transmission comprising:

a clutch drum having a slanted inner surface at a corner and extending from another inner surface of the drum;

a plurality of friction members arranged in the clutch drum within said another inner surface of the drum for selectively engaging each other, said friction members rotate relative to each other about an axis;

a piston for actuating the friction members, the piston contacting a friction member; and a cushion ring having a circumferentially slanted outer surface, the slanted outer surface of the cushion ring corresponding to the slanted inner surface to the clutch drum, wherein the slanted inner surface of the drum extends at an oblique angle relative to the axis, wherein the slanted outer surface of the cushion ring extends at an oblique angle relative to the axis, wherein the cushion ring is installed into the clutch drum, and wherein the slanted outer surface of the cushion ring engages the slanted inner surface of the clutch drum.

2. The clutch assembly of claim 1 further comprising a return spring for returning the piston to an initial position.

3. The clutch assembly of claim 1 wherein an angle $\theta$ of the slanted surface of the clutch drum and the cushion ring is defined by the following equation:

$$\tan \theta = Fa/Fs,$$

where,

Fr=F cos $\theta$: is a radial direction force,

Fa: is an axial direction force, and

Fs: is a radial direction force.

4. A clutch assembly to an automatic transmission comprising:

a clutch drum having a siltnted inner surface at a corner formed by circumferentially bending a circumferential edge of the clutch drum;

a plurality of friction members arranged in the clutch drum for selectively engaging each other;

a piston for actuating the friction members, the piston contacting a friction member: and a cushion ring having a circumferentially slanted outer surface corresponding to the slanted inner surface of the clutch drum, the cushion ring being installed into the clutch drum such that the slanted outer surface of the cushion ring contacts the slanted inner surface of the clutch drum, wherein an angle $\theta$ of the slanted surface of the clutch drum and the cushion ring is defined by the following equation:

$$\tan \theta = Fa/Fs,$$

where,

Fr=F cos $\theta$: is a radial direction force,

Fa: is an axial direction force, And

Fs: is a radial direction force.

5. The clutch assembly of claim 4 further comprising a return spring for returning the piston to an initial position.

6. A clutch assembly of an automatic transmission comprising:

a clutch drum having a slanted inner surface extending at an angle from another inner surface of the clutch drum;

a plurality of friction members arranged in the clutch drum within said another inner surface of the drum for selectively engaging each other, wherein said friction members rotate relative to each other about an axis;

an actuator for exerting a force against a friction member; and a cushion ring having a slanted outer surface extending at an angle from another outer surface of the cushion ring, wherein the slanted inner surface of the drum extends at an oblique angle relative to the axis, wherein the slanted outer surface of the cushion ring extends at an oblique angle relative to the axis, wherein the cushion ring is installed into the clutch drum, and wherein the slanted outer surface of the cushion ring engages the slanted inner surface of the clutch drum.

7. The clutch assembly of claim 6 wherein the actuator moves from an initial position for exerting a force against a friction member, the assembly further comprising a return spring for returning the piston to the initial position.

8. The clutch assembly of claim 6 wherein an angle $\theta$ of the slanted surface of the clutch drum and the cushion ring is defined by the following equation:

$$\tan \theta = Fa/Fs,$$

where,

Fr=F cos $\theta$: is a radial direction forces

Fa: is an axial direction force, and

Fs: is a radial direction force.

9. The clutch assembly of claim 6 wherein the friction members are disposed between the actuator and the cushion ring.

10. The clutch assembly of claim 6 wherein the actuator is a piston.

* * * * *

UNITED STATES PATENT AND TRADEMARK OFFICE
CERTIFICATE OF CORRECTION

PATENT NO. : 6,427,821 B1  Page 1 of 1
DATED : August 6, 2002
INVENTOR(S) : Dong-Hun Lee It is certified that error appears in the above-identified patent and that said Letters Patent is hereby corrected as shown below:

Column 3,
Lines 36 and 56, replace "to" with -- of --.
Line 58, replace "siltnted" with -- slanted --.

Column 4,
Line 17, replace "And" with -- and --.
Line 53, replace "forces" with -- force, --.

Signed and Sealed this

Twenty-fifth Day of March, 2003

JAMES E. ROGAN
*Director of the United States Patent and Trademark Office*